(12) United States Patent
Patel et al.

(10) Patent No.: US 12,019,623 B2
(45) Date of Patent: Jun. 25, 2024

(54) DATA TRANSFER RESILIENCY DURING BULK TO STREAMING TRANSITION

(71) Applicant: Salesforce, Inc., San Francisco, CA (US)

(72) Inventors: Yogesh Prabhudas Patel, Dublin, CA (US); Syed Mohammad Raza Hussain, San Francisco, CA (US); Rajkumar Pellakuru, San Jose, CA (US); Johannes Kienzle, Oakland, CA (US); Violet Gong, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/491,105

(22) Filed: Sep. 30, 2021

(65) Prior Publication Data

US 2023/0101004 A1 Mar. 30, 2023

(51) Int. Cl.
| | |
|---|---|
| *G06F 16/00* | (2019.01) |
| *G06F 16/21* | (2019.01) |
| *G06F 16/22* | (2019.01) |
| *G06F 16/23* | (2019.01) |
| *G06F 16/2455* | (2019.01) |
| *G06F 16/25* | (2019.01) |
| *G06F 16/27* | (2019.01) |

(52) U.S. Cl.
CPC ........ *G06F 16/2386* (2019.01); *G06F 16/214* (2019.01); *G06F 16/2282* (2019.01); *G06F 16/24568* (2019.01); *G06F 16/258* (2019.01); *G06F 16/27* (2019.01)

(58) Field of Classification Search
CPC ........... G06F 16/2386; G06F 16/24568; G06F 16/2282; G06F 16/214; G06F 16/258
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| (Continued) | | |

OTHER PUBLICATIONS

Office Action dated Feb. 3, 2022 for U.S. Appl. No. 17/491,101 (pp. 1-13).

*Primary Examiner* — Khanh B Pham
(74) *Attorney, Agent, or Firm* — Kwan & Olynick LLP (57) ABSTRACT

An indication to migrate requested data objects stored in a source database environment to a destination database environment is received. Some of data objects have many-to-one relationships with other data objects in the source database environment. At least one snapshot file generated by the source database environment is transferred to a destination database environment in bulk transfer mode. Subsequent incoming data received during bulk transfer mode, after the indication is stored in a temporary table. Upon completion of migration of the requested data objects the system transitions from bulk transfer mode to streaming mode. The subsequent incoming data from the temporary table is transferred to the destination database environment in response to the transition to streaming mode. Additional data received after the temporary table is empty is transferred from the source database environment to the destination database environment without use of the temporary table.

20 Claims, 4 Drawing Sheets

(56) References Cited

U.S. PATENT DOCUMENTS

| | | | |
|---|---|---|---|
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,348 B1 | 8/2004 | Ye | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 10,620,851 B1* | 4/2020 | Shemer | G06F 16/122 |
| 10,768,965 B1* | 9/2020 | Habusha | G06F 9/45558 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0177744 A1 | 7/2009 | Marlow et al. | |
| 2009/0187632 A1* | 7/2009 | Alarid | H04L 67/06 709/206 |
| 2013/0318191 A1 | 11/2013 | Yin | |
| 2015/0134910 A1 | 5/2015 | Lee | |
| 2017/0039145 A1 | 2/2017 | Wu | |
| 2017/0277435 A1 | 9/2017 | Wadhwa | |
| 2019/0179755 A1 | 6/2019 | Mudumbai | |
| 2019/0347351 A1* | 11/2019 | Koomthanam | G06F 16/178 |
| 2020/0021663 A1* | 1/2020 | Tarre | G06F 9/00 |
| 2020/0104404 A1* | 4/2020 | Li | G06F 9/5055 |

* cited by examiner

DATA TRANSFER RESILIENCY DURING BULK TO STREAMING TRANSITION

CROSS-REFERENCE TO RELATED APPLICATIONS

This patent application is related to co-pending U.S. patent application Ser. No. 17/491,101, entitled "Techniques and Mechanisms to Provide Efficient Data Migrations" by Yogesh Prabhudas Patel, et al., filed concurrently herewith.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

This cloud-based functionality is provided by computing resources generally organized as data centers that house hardware components (e.g., hardware processing resources, hardware storage devices, networking components and interfaces) to provide the desired functionality. Various situations may necessitate migration of data between data centers. In order to provide a reliable and efficient environment, these migrations should be handled as efficiently and accurately as possible, which can be a complex task when managing large amounts of data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Integration of two large systems involves data transfer from one system to another. This includes initial onboarding (which is sometimes referred to as "Day 0" or "bulk data transfer" in the description that follows) and then continuous data transfer (which is sometimes referred to as "streaming traffic" in the description that follows). In a system, where an application is continuously generating data, the continuous data generation creates challenges to onboard the application to new integration(s) because there are state transitions involved between bulk data transfer and continuous data transfer. It is a challenge ensuring that there is no data loss during state transition from bulk to streaming.

The examples that follow can provide a resilient system to support data transfer without any data loss when the data transfer system performs a state transition from bulk data transfer pipeline to continuous streaming data transfer pipeline. Streaming traffic mechanisms generally have certain data retention windows and various example embodiments ensure that bulk data transfer finishes before streaming flow comes in. This problem becomes even more critical when trying to transfer large volumes of data (e.g. hundreds of millions of records).

In several of the examples that follow, data transfer occurs between a services core that is deployed in private data center and an activity platform that is deployed in a public cloud environment. Transfer of services core (e.g., CRM entity) information (e.g., contact, account, lead, opportunity, quotes, contracts) to the activity platform to create system that can provide relationship between these entities with associated email addresses, for example. This example can be referred to as an Email Address Association Service (i.e. EAAS). This example service provides a single centralized system for functionality related to the association of email addresses to CRM records as defined by the relationships within a given schema. Other applications and customer-based features, for example, Activity Metrics, High Velocity Sales, Engagement Metrics can use this EAAS data to access relevant CRM records given a particular email address. The techniques and architectures described herein can also be utilized in other environments with different types of data.

In various embodiments, once the bulk data transfer is completed, other data (e.g., organization data in a multi-organization environment) is migrated to one or more streaming services to listen to any changes to, for example, EAAS entities and send those updates to the services cored to keep data in sync. As described in greater detail below, the initial data (which is sometimes referred to as "Day 0 data" in the description that follows) pipeline should finish successfully before the streaming pipeline is initiated.

In some embodiments, once the bulk data transfer pipeline commences, it records a replayId value (which can be a KAFKA offset number, for example) of the topic at that time and makes that information available to the consumer. This is done so that once the state transition of the streaming service from bulk to streaming is successful the streaming service knows from what offset in the topic it is to start reading the data.

In some example embodiments, the default data retention limit is three days. That means that if the initial data transition process takes more than three days to finish, the streaming service cannot start from the offset noted by the replayId field above and customer data loss may occur without additional transition support. Multiple examples of additional transition support are provided below so that initial data transitions that exceed the default data retention limit can be completed without loss of data.

In the example embodiments that follow, an intermediate persistent storage accessible by consumer is utilized to process bulk as well as streaming traffic. However, this persistent storage is not utilized in cases where bulk data transfer can be completed within retention time window (e.g., three days in the example above). A data consumer can define an independent threshold time value which is configurable and less than retention window. A separate monitoring route can be utilized for the consumer that keeps track of time taken in bulk data transfer so far, and when it is beyond defined threshold value, and the message queue can be drained (in some embodiments backed by KAFKA) which contains streaming data into temporary persistent storage. At time of storing data into the temporary persistent storage, the message format is maintained to avoid additional processing at later stage. This process can be repeated at defined threshold interval to support bulk operation which can run for days.

In some example embodiments, once bulk data transfer finishes, before migrating other data (e.g., organizational data) to streaming the state, the consumer can read messages from the temporary persistent storage and send to downstream consumers. This will maintain the order in which publisher sent data to consumer.

These example embodiments can provide several advantages over previous strategies including, for example, decoupling of dependency on bulk data transfer limits. That is, no matter how long the bulk data transfer takes, once it completes successfully and the data consumer makes the state transition from transfer to streaming, no data will be lost. In another embodiment, temporary storage can also support versioning for data and periodically delete data corresponding to old versions. In some embodiments, the same persistent database and cluster resources can be used, the system resource cost to provide the functionality described herein may be relatively low. Further, ordering of data is maintained throughout the process.

Figure 1:
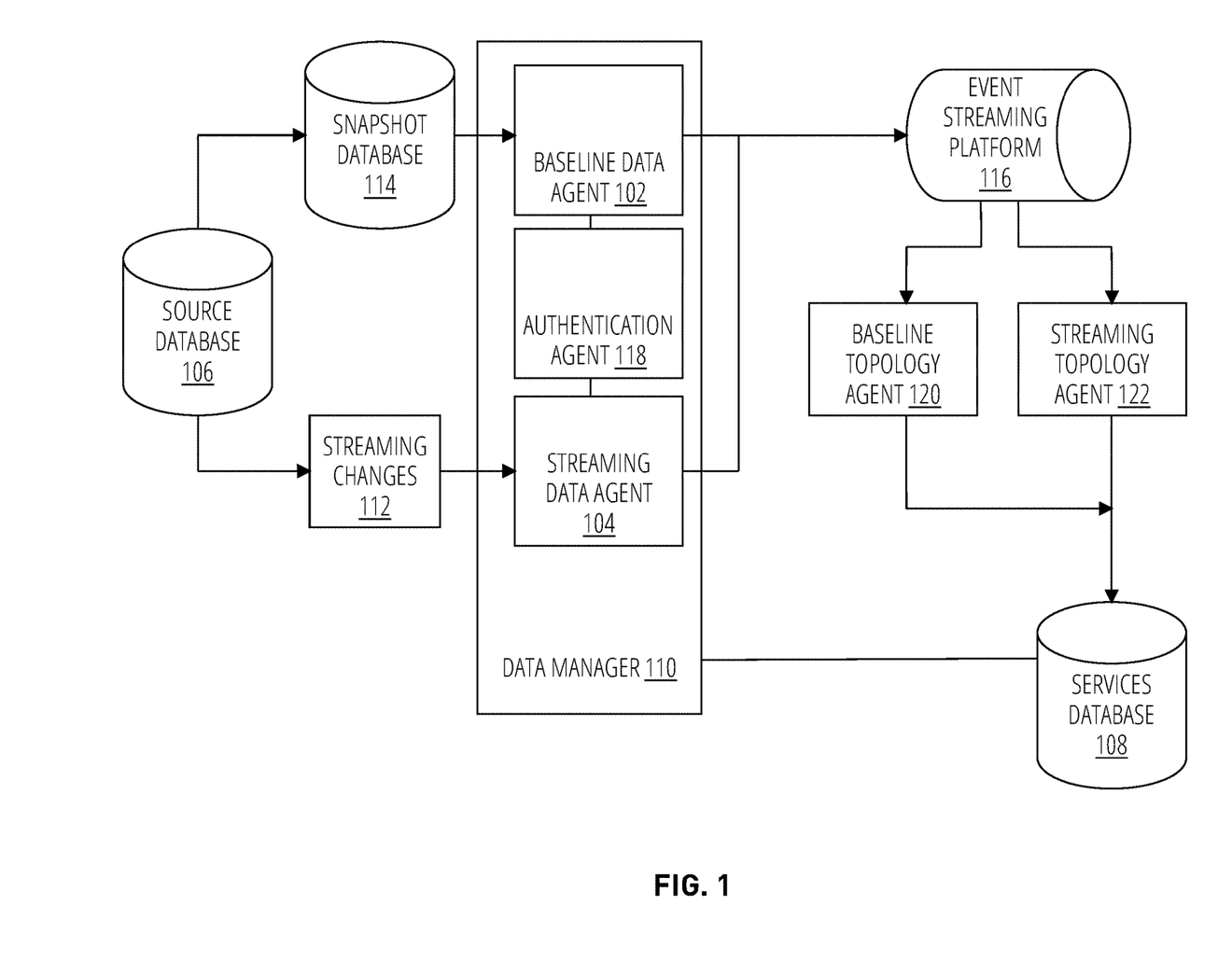
FIG. 1 is a block diagram of one embodiment of an environment to support resilient bulk data transfer to streaming data transitions.

FIG. 1 is a block diagram of one embodiment of an environment to support resilient bulk data transfer to streaming data transitions. The example of FIG. 1 provides specifics based on an email address association service (EAAS) environment; however, the techniques and components illustrated in FIG. 1 can support resilient bulk data transfer to streaming data transition for any type of data. In general, EAAS is a service that provides a single centralized system for functionality related to the association of email addresses to customer relationship management (CRM) records as defined by the relationships within a given schema. In a multitenant environment, each tenant, or organization, can have a custom schema; however, multitenancy is an optional component for the environment of FIG. 1. Many applications and/or features (e.g., activity metrics, sales analysis, engagement metrics) can be provided utilizing the data that has been transferred.

The data transfer mechanism of FIG. 1 generally consists of two pipelines, the "Bulk" pipeline and the "Streaming" pipeline. In the example embodiment of FIG. 1, the bulk pipeline generally flows through baseline data agent 102 and the streaming pipeline generally flows through streaming data agent 104. In some example embodiments, source database 106 maintains data for one or more entities/users. In some example embodiments, source database 106 has a at least some objects having many-to-one relationships with one or more other objects. Source database 106 can store various types of data including CRM data (e.g., account names, contact names, lead information, quotes, contract details) for the one or more entities/users. Source database 106 can be used to maintain data for one or more applications or services (e.g., a CRM environment).

In response to initiation of data transfer from source database 106 to services database 108, data on source database 106 for the requesting entity/user can be transferred via the bulk pipeline. After the bulk data transfer has completed successfully and the core data has been stored in services database 108, data manager 110 can perform a state transition from bulk transfer mode to streaming mode for the entity/user making the transfer. After the state transition, data manager 110 and streaming data agent 104 can monitor streaming changes 112 for changes and update services database 108 accordingly.

In order to properly transfer data from source database 106 to services database 108, the bulk pipeline process should finish successfully before the streaming pipeline commences. In some example embodiments, an event streaming platform such as KAFKA can be utilized to manage the flow of data. APACHE KAFKA is an open-source distributed event streaming platform that can be utilized to provide high-performance data pipelines and related functionality. KAFKA is a trademark of the Apache Software Foundation. In alternate embodiments, other event streaming platforms can be utilized.

In the KAFKA example embodiment, an offset value (e.g., replayId) from the appropriate event topic can be utilized by data manager 110 to manage the process described with respect to FIG. 1. Thus, at the time of the state transition from bulk transfer to streaming, data manager 110 can initiate reading of streaming changes 112 at the correct location in the event stream.

Figure 2:
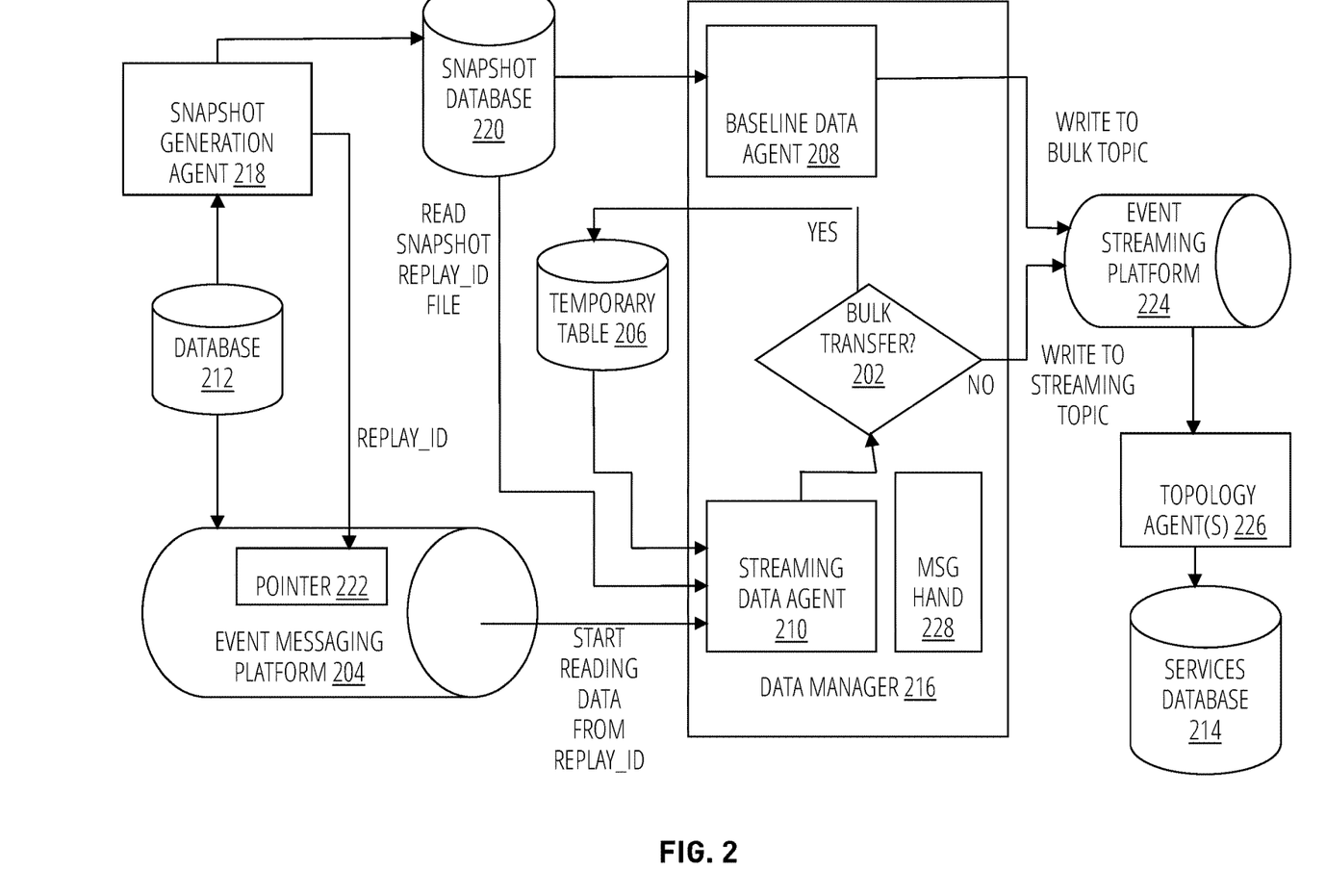
FIG. 2 is a block diagram of one embodiment of an architecture to provide resilient bulk data transfer to streaming data transitions.

In some embodiments, the data transfer mechanisms may have a limited data retention limit (e.g., 3 days, 63 hours, 5 days) during which data should be transferred without risk of losing data. However, with larger bulk transfers, this may not be accomplished within the data retention limit timeframe. The example of FIG. 1 provides description of approaches to accomplish the transfer in a resilient manner. The example of FIG. 2 provides an embodiment utilizing a temporary database table to provide resiliency in environments with data retention limits. The size of the temporary table can be chosen to provide sufficient data retention so that there is not loss in data during the bulk transfer stage. In some embodiments, the side of the temporary table can be dynamically adjustable. In some embodiments, the temporary table can support versioning functionality so that old versions of data can be periodically deleted. In alternate embodiments, overflow data may be stored in source database 106 or snapshot database 114, for example.

When a user or organization (not illustrated in FIG. 1) initiates a transfer from source database 106 to services database 108, for example, to begin use of services (Activity Metrics, High Velocity Sales, Engagement Metrics) associated with services database 108, or to augment existing services associated with services database 108, snapshot database 114 and baseline data agent 102 can be utilized transfer data from source database 106 to services database 108. In one embodiment, baseline data agent 102 manages transfer of data from snapshot database 114 to event streaming platform 116 for a single user or organization. Multiple parallel baseline data agents 102 can be utilized to manage multiple parallel transfers for multiple users and/or organizations. Authentication agent 118 can interact with baseline data agent 102 to authenticate data being transferred. This bulk data transfer occurs when data manager 110 is in the bulk transfer mode.

Baseline data agent 102 processes snapshot data from snapshot database 114 and forwards the processed data to event streaming platform 116. In one embodiment, event streaming platform 116 is provided by KAFKA-based functionality; however, in alternate embodiments other technologies can be utilized. The streamed snapshot data from event streaming platform 116 is processed by baseline topology agent 120 to provide the desired format for services database 108.

Under certain conditions (e.g., large amounts of bulk data to be transferred, reduced streaming capacity), the bulk data transfer time period may exceed the data retention limit time for one or more of the system components. In some embodiments, a temporary table in services database 108 can be utilized to effectively provide an unlimited data retention period. In other example embodiments, the temporary table can be provided in another manner. For example, data manager 110 could have a dedicated database for data transition support. The temporary database table is described in greater detail below in FIG. 2.

Once the bulk transfer process is complete, data manager 110 can transition to streaming mode where data related to events after the initiation of the transition process are streamed from source database 106 to services database 108 through streaming changes 112 and streaming data agent 104. Streaming data agent 104 processes streaming changes 112 data (e.g., new contact names, quote updates) and forwards the processed data to event streaming platform 116. Authentication agent 118 can interact with streaming data agent 104 to authenticate data being transferred. The streamed change data from event streaming platform 116 can be processed by streaming topology agent 122 to provide the desired format for services database 108.

FIG. 2 is a block diagram of one embodiment of an architecture to provide resilient bulk data transfer to streaming data transitions. In the example embodiment of FIG. 2, incoming data from event messaging platform 204 can be stored in temporary table 206 during the during the bulk transfer stage. Upon completion of the bulk transfer, a state transition to the streaming stage occurs and data is read from temporary table 206 until the table is empty and then the streaming process pulls from event messaging platform 204.

The data transfer mechanism of FIG. 2 provides the two pipelines described above (i.e., the bulk pipeline and the streaming pipeline). In the example embodiment of FIG. 2, the bulk pipeline generally flows through baseline data agent 208 and the streaming pipeline generally flows through streaming data agent 210. In some example embodiments, database 212 maintains data for one or more entities/users. In some example embodiments, database 212 stores at least some objects having many-to-one relationships with one or more other objects. Database 212 can store various types of data including CRM data (e.g., account names, contact names, lead information, quotes, contract details) for the one or more entities/users. Database 212 can be used to maintain data for one or more applications or services (e.g., a CRM environment).

In response to initiation of data transfer from database 212 to services database 214, data on database 212 for the requesting entity/user can be transferred via the bulk pipeline. After the bulk data transfer has completed successfully and the data has been stored in services database 214, data manager 216 can perform a state transition from bulk transfer mode to streaming mode for the entity/user making the transfer. After the state transition, data manager 216 and streaming data agent 210 can copy data from temporary table 206 to update services database 214 with event data corresponding to the time period of the bulk data transfer.

When a user or organization (not illustrated in FIG. 2) initiates a transfer from database 212 to services database 214, snapshot generation agent 218, snapshot database 220 and baseline data agent 208 can be utilized transfer data from database 212 to services database 214. In one embodiment, snapshot generation agent 218 functions to capture snapshots of data to be stored on snapshot database 220. A snapshot is a copy of a set of data (e.g., data belonging to a particular organization or application) at a particular point in time. Snapshot database 220 can store snapshots (and related information) for one or more users or entities that utilize database 212. In one embodiment, snapshot generation agent 218 can provide an identifier (e.g., Replay_ID) to event messaging platform 204 to indicate the snapshot corresponding to the beginning of the bulk transfer stage. Pointer 222 in event messaging platform 204 can include the identifier and other information to enable the functionality of event messaging platform 204 in streaming mode (described in greater detail below).

In one embodiment, baseline data agent 208 manages transfer of data from snapshot database 220 to event streaming platform 224. In a KAFKA-based example embodiment, baseline data agent 208 may write to a bulk topic in event streaming platform 224 where the bulk topic is used to manage the flow of the data transferred in bulk mode to services database 214 via topology agent(s) 226. In alternate, non-KAFKA embodiments, different streaming flow management technologies can be utilized. This bulk data transfer occurs when data manager 216 is in the bulk transfer mode.

Baseline data agent 102 processes snapshot data from snapshot database 114 and forwards the processed data to event streaming platform 116. In one embodiment, event streaming platform 116 is provided by KAFKA-based functionality; however, in alternate embodiments other technologies can be utilized. The streamed snapshot data from event streaming platform 116 is processed by baseline topology agent 120 to provide the desired format for services database 108.

In some embodiments, when data manager 216 is in bulk transfer mode streaming data agent 210 can function to start reading data from the Replay_ID location and, if in bulk transfer mode (202) writes event data to temporary table 206. Thus, data to be streamed after the initiation of the bulk transfer is read by streaming data agent 210 and stored in temporary table 206 rather than the final destination of services table(s) in services database 214. By using this intermediate temporary table 206 the data retention limit is no longer a time-based constraint and can be managed by allocating space in services database 214 for temporary table 206 to accommodate any length of time required for the initial bulk transfer. In one embodiment, data is stored temporary table 206 on a per-topic basis. In alternate embodiments, data may be stored in temporary table 206 on a per-organization basis. In other embodiments, data can be stored in temporary table 206 on a per-organization and per-topic basis.

This process continues until the bulk transfer has been completed through baseline data agent 208, event streaming platform 224 and topology agent(s) 226. Upon completion of the bulk transfer, data manager 216 transitions out of bulk transfer mode (202) and streaming data agent 210 writes data to event streaming platform 224. In a KAFKA-based example embodiment, baseline streaming data agent 210 may write to a streaming topic in event streaming platform 224 where the streaming topic is used to manage the flow of the data transferred in streaming mode to services database 214 via topology agent(s) 226. In alternate, non-KAFKA embodiments, alternate streaming flow management can be utilized.

In streaming mode, streaming data agent 210 writes data from temporary table 206 first and then from event messaging platform 204 when temporary table 206 is empty. Streaming data agent 210 can use Replay_ID (or other tracking information) to manage the transfer of data in an orderly manner without skipping or losing data. Once the transfer is complete and the data from temporary table 206 has been transferred to services database 214, streaming data agent 210 can manage streams of data from database 212 and event messaging platform 204 without use of temporary table 206.

In some example embodiments streaming data agent 210 can provide both data loss prevention (i.e., DLP) streaming traffic (e.g., while in bulk transfer mode) and manage steady state streaming (e.g., in streaming mode). In some embodiments, logic to distinguish between migration (e.g., bulk transfer) traffic and steady state streaming traffic can be part of data manager 216 as message handler 228.

Figure 3:
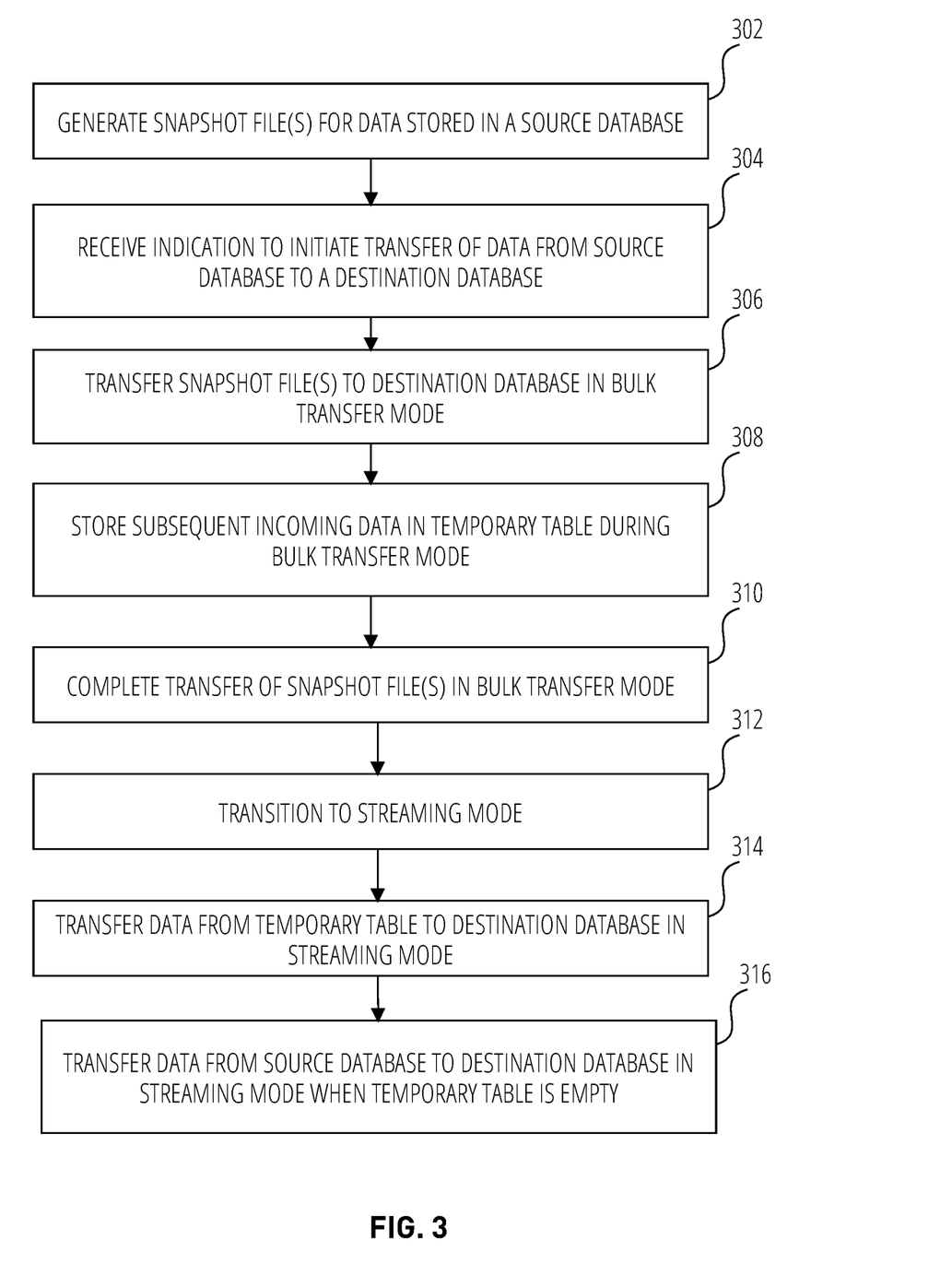
FIG. 3 is a flow diagram of one embodiment of a technique to provide resilient bulk data transfer to streaming data transitions.

FIG. 3 is a flow diagram of one embodiment of a technique to provide resilient bulk data transfer to streaming data transitions. The functionality described with respect to FIG. 3 can be provided in various types of environments in which data is maintained in a database. In the example embodiments described herein, the source database (e.g., source database 106, database 212) can be part of a different platform/cloud/environment than the destination database (e.g., services database 108, services database 214). In some example embodiments, the source database stores at least some objects having many-to-one relationships with one or more other objects.

In block 302, snapshot files are generated for data stored in a source database (e.g., source database 106, database 212). In one embodiment, the snapshot files can be stored in a cloud-based database environment and/or a multitenant database environment. The process of generating snapshot files for the source database can be performed as part of maintaining the source database and not specifically in preparation for the data migration techniques described herein.

In block 304, an indication to initiate transfer of data from the source database to the destination database is received. The indication can be the result of, for example, specific user input (e.g., via graphical user interface), as part of a startup process for a new service or environment, etc. As another example, the indication can be received from an intermediate management entity (e.g., data manager 110, data manager 216) or from the management service for the destination database.

In block 306, one or more snapshot files are transferred to the destination database in bulk transfer mode (e.g., via baseline data agent 102 in data manager 110, event streaming platform 116 and baseline topology agent 120, or via baseline data agent 208 in data manager 216, event streaming platform 224 and topology agent(s) 226). In one embodiment, in association with transfer of the snapshot file(s), an offset or other indicator (e.g., Replay_ID) can be used to indicate a starting point for subsequent streaming after the bulk transfer has been completed. In one embodiment, the snapshot file(s) is/are transferred from the cloud-based database environment to the destination database via a streaming platform, which some formatting and management of data.

In block 308, subsequent incoming data (e.g., to source database 106, to database 212) can be stored in a temporary table (e.g., temporary table 206) during bulk transfer mode. Thus, data to be transferred that is received after initiation of the bulk transfer are stored in the temporary table and not added to the transfer queue (or stored in a way that the new data could be lost if the bulk transfer process exceeds the data retention limit). In one embodiment, the temporary table is a table in the destination database to be used for the purpose of staging data to be migrated until the migration process is complete.

In block 310, transfer of the snapshot file(s) to the destination database is completed. This process may take longer than the default data retention period provided by various system components (e.g., event messaging platform 204). In block 312, the environment control mechanisms (e.g, data manager 110, data manager 216) transition to streaming mode.

In block 314, data is transferred from the temporary table to the destination database in streaming mode. In some embodiments, incoming data to be migrated may be added to the temporary table during this period when data is also being transferred out of the temporary to table (e.g., by streaming data agent 210) to the destination database. In block 316, data is streamed from the source database to the destination database when the temporary table is empty. At this point, the system may operate in an ongoing streaming mode as the data migration has been completed and subsequent data are the result of the normal operation of the environment.

Figure 4:
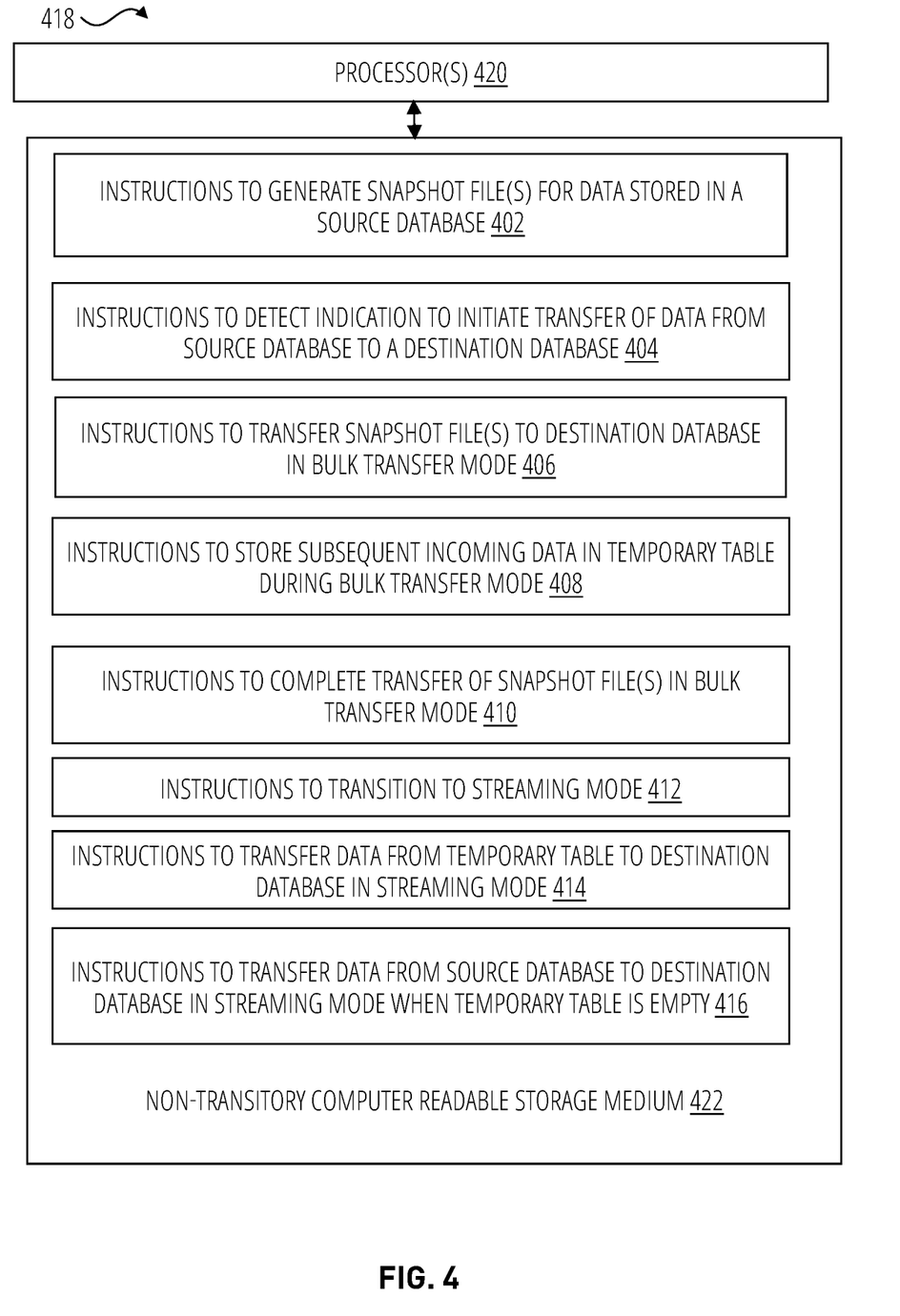
FIG. 4 is a block diagram of one embodiment of a system to provide resilient bulk data transfer to streaming data transitions.

FIG. 4 is a block diagram of one embodiment of a system to provide resilient bulk data transfer to streaming data transitions. In an example, system 418 can include processor(s) 420 and non-transitory computer readable storage medium 422. Non-transitory computer readable storage medium 422 may store instructions 402, 404, 406, 408, 410, 412, 414 and 416 that, when executed by processor(s) 420, cause processor(s) 420 to perform various functions. Examples of processor(s) may include a microcontroller, a microprocessor, a central processing unit (CPU), a graphics processing unit (GPU), an application-specific integrated circuit (ASIC), a field programmable gate array (FPGA), a system on a chip (SoC), etc. Examples of a non-transitory computer-readable storage medium include tangible media such as random access memory (RAM), read-only memory (ROM), electrically erasable programmable read only memory (EEPROM), flash memory, a hard disk drive, etc.

In one embodiment, instructions 402 cause processor(s) 420 to generate snapshot files for data stored in a source database (e.g., source database 106, database 212). In some example embodiments, the source database stores at least some objects having many-to-one relationships with one or more other objects. The process of generating snapshot files for the source database can be performed to run the database management system for the source database and not specifically for the purposes of the data migration techniques described herein. Various techniques and timing can be utilized for generating the snapshot files. In one embodiment, the snapshot files can be stored in a cloud-based database environment and/or a multitenant database environment.

In one embodiment, instructions 404 cause processor(s) 420 to detect an indication to initiate transfer of data from the source database to the destination database. The indication can be received, for example, via application program interface (API) indicating specific user input (e.g., via graphical user interface) or as part of a startup process for a new service or environment. As another example, the indication can be received from an intermediate management entity (e.g., data manager 110, data manager 216) or from the management service for the destination database.

In one embodiment, instructions 406 cause processor(s) 420 to transfer one or more snapshot files to the destination database in bulk transfer mode (e.g., via baseline data agent 102 in data manager 110, event streaming platform 116 and baseline topology agent 120, or via baseline data agent 208 in data manager 216, event streaming platform 224 and topology agent(s) 226). In one embodiment, in association with transfer of the snapshot file(s), an offset or other indicator (e.g., Replay_ID) can be used to indicate a starting point for subsequent streaming after the bulk transfer has been completed.

In one embodiment, instructions 408 cause processor(s) 420 to store subsequent incoming data in a temporary table (e.g., temporary table 206) during bulk transfer mode. This subsequently received data (i.e., after initiation of the migration process) is to be transferred after the snapshot file(s) have been transferred and before streaming of data from the source database to the destination database. In one embodiment, the temporary table is a table in the destination database to be used for the purpose of staging data to be migrated until the migration process is complete.

In one embodiment, instructions 410 cause processor(s) 420 to complete transfer of the snapshot file(s) in bulk transfer mode. This process may take longer than the default data retention period provided by various system components (e.g., event messaging platform 204). In one embodiment, instructions 412 cause processor(s) 420 to invoke a transition to streaming mode.

In one embodiment, instructions 414 cause processor(s) 420 to transfer data from the temporary table to the destination database in streaming mode. In some embodiments, incoming data to be migrated may be added to the temporary table during this period when data is also being transferred out of the temporary to table (e.g., by streaming data agent 210) to the destination database. In one embodiment, instructions 416 cause processor(s) 420 to transfer data from the source database to the destination database when the temporary table is empty.

In the above description, numerous specific details such as resource partitioning/sharing/duplication embodiments, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other embodiments whether or not explicitly described.

For example, the figure(s) illustrating flow diagrams sometimes refer to the figure(s) illustrating block diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

In the detailed description, references are made to the accompanying drawings, which form a part of the description and in which are shown, by way of illustration, specific embodiments. Although these disclosed embodiments are described in sufficient detail to enable one skilled in the art to practice the embodiments, it is to be understood that these examples are not limiting, such that other embodiments may be used and changes may be made to the disclosed embodiments without departing from their spirit and scope. For example, the blocks of the methods shown and described herein are not necessarily performed in the order indicated in some other embodiments.

Additionally, in some other embodiments, the disclosed methods may include more or fewer blocks than are described. As another example, some blocks described herein as separate blocks may be combined in some other embodiments. Conversely, what may be described herein as a single block may be implemented in multiple blocks in some other embodiments. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an embodiment," "one embodiment," "some embodiments," or "certain embodiments" indicates that a particular feature, structure, or characteristic described in connection with the implementation is included in at least one embodiments. Thus, the appearances of the phrase "an embodiment," "one embodiment," "some embodiments," or "certain embodiments" in various locations throughout this specification are not necessarily all referring to the same embodiments.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed embodiments can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium").

Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific embodiments have been described herein, it should be understood that they have been presented by way of example only, and not limitation. The breadth and scope of the present application should not be limited by any of the embodiments described herein but should be defined only in accordance with the following and later-submitted claims and their equivalents. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A system comprising:
   a processor;
   memory;
   a first database environment to store source data having objects in a first format having at least some of objects having many-to-one relationships with one or more other objects;
   a second database environment to receive data objects from the first database environment through a streaming mechanism supporting multiple streaming topics with corresponding data retention periods; and
   a data manager agent coupled with the first database environment and with the second database environment to facilitate a migration process via a bulk data transfer, wherein facilitating the migration process includes determining whether the time it takes to complete the migration process would exceed a predetermined data retention window threshold and when the time it takes to complete the migration process would exceed the predetermined data retention window, then the data manager agent will write data to a temporary database table to be stored during the migration process prior to transmission to selected streaming topics in the second database environment, and, upon completion of the migration process, perform a state transition from a bulk mode to a streaming mode by ingesting data from the temporary database using a streaming data transfer before ingesting data from the first database environment, when the time it takes to complete the migration process would not exceed the predetermined data retention window, new data received in a streaming mode can be read starting at an offset value recorded at the start of the migration process.

2. The system of claim 1 wherein the temporary database table is stored in the second database environment.

3. The system of claim 2 wherein a size of the temporary database table is dynamically modifiable.

4. The system of claim 1 wherein the temporary database table stores data for a designated streaming topic from the selected streaming topics.

5. The system of claim 1 wherein the temporary database table provides a data storage period that is greater than the data retention period of the corresponding stream.

6. The system of claim 1 wherein the first database environment generates one or more snapshot files to provide copies of selected objects at a corresponding point in time.

7. The system of claim 6 wherein the migration process comprises at least migrating one or more snapshot files to the second database environment.

8. A non-transitory computer-readable medium having stored thereon instructions that, when executed by one or more processors, are configurable to cause the one or more processors to:
    detect an indication to migrate requested data stored in a source database environment to a destination database environment, wherein the source database environment generates one or more snapshot files to provide copies of data objects at a corresponding point in time;
    transfer at least one snapshot file to a destination database environment as part of a migration process in a bulk transfer mode;
    determine whether the time it takes to complete the migration process would exceed a predetermined data retention window threshold;
    when it is determined that the time it takes to complete the migration process would exceed the predetermined data retention window, then:
        store subsequent incoming data received during the bulk transfer mode and after the indication in a temporary database table, if any;
        transition from the bulk transfer mode to a streaming mode in response to completion of migration of the requested data; and
        transfer the subsequent incoming data, if any, from the temporary database table to the destination database environment using a streaming data transfer in response to the transition to the streaming mode; and
    when it is determined that the time it takes to complete the migration process would not exceed the predetermined data retention window, then transfer incoming data received after the migration process has completed to the destination database environment starting at an offset value recorded at the start of the migration process.

9. The non-transitory computer-readable medium of claim 8 wherein the temporary database table is stored in the second database environment.

10. The non-transitory computer-readable medium of claim 9 wherein a size of the temporary database table is dynamically modifiable.

11. The non-transitory computer-readable medium of claim 8 wherein the temporary database table stores data for a designated streaming topic from multiple streaming topics supported by the source database environment.

12. The non-transitory computer-readable medium of claim 11 wherein the temporary database table provides a data storage period that is greater than a data retention period of the corresponding stream.

13. The non-transitory computer-readable medium of claim 8 wherein the source database environment stores database objects in a first format and at least some of objects have many-to-one relationships with one or more other objects in the source database environment.

14. The non-transitory computer-readable medium of claim 8 wherein the one or more snapshot files are stored in a database external to the source database environment.

15. A method comprising:
    receiving an indication to migrate requested data objects stored in a source database environment to a destination database environment, wherein at least some of data objects have many-to-one relationships with one or more other data objects in the source database environment;
    transfer at least one snapshot file to a destination database environment as part of a migration process in a bulk transfer mode;
    determine whether the time it takes to complete the migration process would exceed a predetermined data retention window threshold;
    when it is determined that the time it takes to complete the migration process would exceed the predetermined data retention window, then:
        store subsequent incoming data received during the bulk transfer mode and after the indication in a temporary database table, if any;
        transition from the bulk transfer mode to a streaming mode in response to completion of migration of the requested data; and
        transfer the subsequent incoming data, if any, from the temporary database table to the destination database environment using a streaming data transfer in response to the transition to the streaming mode; and
    when it is determined that the time it takes to complete the migration process would not exceed the predetermined data retention window, then transfer incoming data received after the migration process has completed to the destination database environment starting at an offset value recorded at the start of the migration process.

16. The method of claim 15 wherein the temporary database table is stored in the second database environment.

17. The method of claim 15 wherein a size of the temporary database table is dynamically modifiable.

18. The method of claim 15 wherein the temporary database table stores data for a designated streaming topic from multiple streaming topics supported by the source database environment.

19. The method of claim 15 wherein the temporary database table provides a data storage period that is greater than a data retention period of the corresponding stream.

20. The method of claim 15 wherein the one or more snapshot files are stored in a database external to the source database environment.

* * * * *